(12) United States Patent
Hsu

(10) Patent No.: US 7,161,138 B2
(45) Date of Patent: Jan. 9, 2007

(54) ELECTRICAL PRODUCT AND TILTING CONTROL DEVICE THEREOF

(75) Inventor: Ting-Chung Hsu, Taoyuan (TW)

(73) Assignee: Mitac International Corp., Taoyuan (TW)

(*) Notice: Subject to any disclaimer, the term of this patent is extended or adjusted under 35 U.S.C. 154(b) by 0 days.

(21) Appl. No.: 11/162,039

(22) Filed: Aug. 26, 2005

(65) Prior Publication Data
US 2006/0151685 A1 Jul. 13, 2006

(30) Foreign Application Priority Data
Jan. 12, 2005 (TW) .............................. 94100812 A

(51) Int. Cl.
*G01D 5/34* (2006.01)
*H01H 35/02* (2006.01)
*G01C 9/06* (2006.01)

(52) U.S. Cl. ............................... 250/231.1; 33/366.23; 200/61.52

(58) Field of Classification Search ............. 250/231.1, 250/221, 229, 239; 33/366.12, 366.23; 340/689; 200/61.45 R, 61.52
See application file for complete search history.

(56) References Cited

U.S. PATENT DOCUMENTS 5,373,153 A * 12/1994 Cumberledge et al. .. 250/231.1
6,455,790 B1 * 9/2002 Ogden ..................... 200/61.46

* cited by examiner

*Primary Examiner*—Kevin Pyo
(74) *Attorney, Agent, or Firm*—Jiang Chyun IP Office

(57) ABSTRACT

An electrical product and a tilting control device thereof are provided. The tilting control device comprises a shell body, a light source, at least a transparent box, an opaque element, a plurality of photo-sensing units and a logic circuit. The light source is disposed inside the shell body for emitting light. The transparent box is disposed along the path of the light inside the shell body. The opaque element is supported by a carrier surface within the transparent box. The photo-sensing units are disposed inside the shell body at each end under the transparent box. When the tilting control device tilts, the opaque element will move towards one end of the transparent box so that a portion of the light traveling to the photo-sensing unit is obstructed. The logic circuit is coupled to the photo-sensing units for outputting a signal according to the light intensity detected by the photo-sensing units.

22 Claims, 5 Drawing Sheets

ELECTRICAL PRODUCT AND TILTING CONTROL DEVICE THEREOF

CROSS-REFERENCE TO RELATED APPLICATION

This application claims the priority benefit of Taiwan application serial no. 94100812, filed on Jan. 12, 2005. All disclosure of the Taiwan application is incorporated herein by reference.

BACKGROUND OF THE INVENTION

1. Field of the Invention

The present invention relates to an electronic product and a state monitoring device. More particularly, the present invention relates to an electronic product and its environmentally fit, easy to install and easy to use tilting control device thereof.

2. Description of the Related Art

With the rapid development of electronic and communication products in recent years, many types of electrical products have become an indispensable part of our life. The most common electrical products for the family include televisions, refrigerators, air conditioners, computers, video CD/VCD players and DVD players. Most of these products need to or prefer to work in an environment free from any external disturbance. In other words, if an external force causes these electronic products to tilt or rock in operation, some of its internal elements might be damaged.

To resolve the aforementioned problem, some conventional electrical products have a level control switch installed so that power to the electrical product is automatically cut off when a tilting or rocking motion in the electrical product is sensed. FIG. 1A is a schematic cross-sectional view of a conventional level meter in a horizontal state. FIG. 1B is a schematic cross-sectional view of a conventional level meter in a tilted state.

As shown in FIG. 1A, a conventional level meter 100 has a sealed receptacle 102 with some electricity-conducting mercury 104 therein. Above the surface of the mercury 104, an electrode pair 106 is disposed on one sidewall of the receptacle. As shown in FIG. 1B, when the level meter 100 tilts or rocks, some of the mercury 104 may cover the electrode pair 106 to cause a short circuit in the electrode pair 106. At this moment, the driving circuit 110 coupled to the electrode pair 106 will automatically cut off the power to the electronic device to avoid any unexpected damage to the electronic product in the tilted state.

However, mercury is a toxic material that could be very harmful to our health. Furthermore, improperly disposed mercury will seriously pollute our environment. Thus, the conventional mercury level meters will no longer meet the market demand of an environmental consciousness standard.

SUMMARY OF THE INVENTION

Accordingly, at least one objective of the present invention is to provide a tilting control device that can be applied to any system for determining whether the system operates in a leveled state. Furthermore, the tilting control device is designed to meet all relevant rules for environmental protection.

At least a second objective of the present invention is to provide an electrical product such that power is automatically cut or a warning signal is issued when the electrical product tilts beyond a limit to prevent any damage to some of the elements due to action in a tilted state.

To achieve these and other advantages and in accordance with the purpose of the invention, as embodied and broadly described herein, the invention provides a tilting control device. The tilting control device mainly comprises a shell body, a light source, at least a transparent box, an opaque element, a plurality of photo-sensing units and a logic circuit. The light source is disposed inside the shell body for emitting a beam of light. The transparent box is disposed inside the shell body along the path of the light beam. The opaque element is supported by a carrier surface within the transparent box. When the tilting control device tilts, the opaque element will move towards one end of the transparent box. The photo-sensing units are disposed inside the shell body at the bottom of each end of the transparent box. The logic circuit is coupled to the photo-sensing units for outputting a signal according to the light intensity detected by the photo-sensing units.

The present invention also provides an electric product that mainly comprises a main driving circuit and the aforementioned tilting control device. The main driving circuit drives the electrical product while the logic circuit within the tilting control device is coupled to the photo-sensing units and the main driving circuit. The logic circuit outputs a signal to the main driving circuit according to the light intensity detected by the photo-sensing units so that the main driving circuit can execute an appropriate action according to the signal.

In the preferred embodiment of the present invention, the shell body of the tilting control device is fabricated using a non-transparent material to prevent the photo-sensing units from sensing some background light and performing some unexpected action.

In the preferred embodiment of the present invention, the aforementioned tilting control device further comprises a light guide disposed between the light source and the transparent box for guiding the light from the light source to the transparent box evenly. In one embodiment, the opaque element is a sphere, a roller or a movable non-transparent body, for example.

In the preferred embodiment of the present invention, the carrier surface of the transparent box is U-shaped so that the opaque element is located at the lowest point of the U-shaped surface before the tilting control device is tilted. In another embodiment, the carrier surface of the transparent box has a restraining section. The opaque element is constrained within the restraining section before the tilting control device is tilted. In one embodiment, the constraining section is a recess, for example. In addition, the carrier surface of the transparent box may have two protrusions such that the restraining section is located between the protrusions.

In one preferred embodiment of the present invention, the aforementioned photo-sensing unit comprises a photo-sensing resistor and a switching device. The switching device is coupled to the photo-sensing resistor and the logic circuit for connecting the photo-sensing resistor and the logic circuit electrically by selection. In one embodiment, the switching element is a transistor, for example. The base of the transistor is coupled to the photo-sensing resistor and the collector of the transistor is coupled to the logic circuit. In addition, the logic circuit is an NOR logic circuit, for example.

The tilting control device of the present invention utilizes the light intensity received by the photo-sensing unit to determine if a tilt has actually occurred. Once tilting or rocking motion has been detected, power to the electrical product is automatically cut off. Hence, damage to the electrical product resulting from operating in a tilted state is prevented. Furthermore, since a photoelectric sensing method instead of mercury is used to detect the degree of tilting, this particular design is environmentally friendly.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
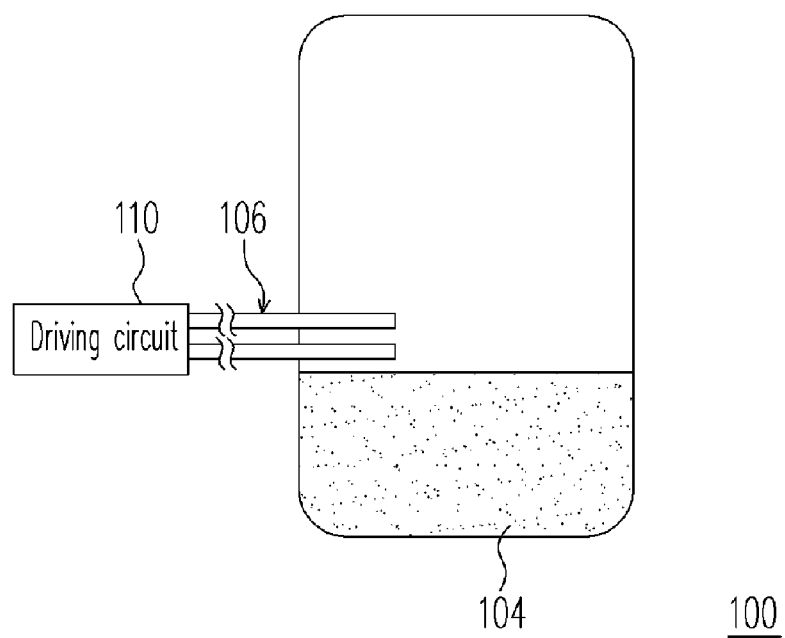
FIG. 1A is a schematic cross-sectional view of a conventional level meter in a horizontal state.
Figure 1B:
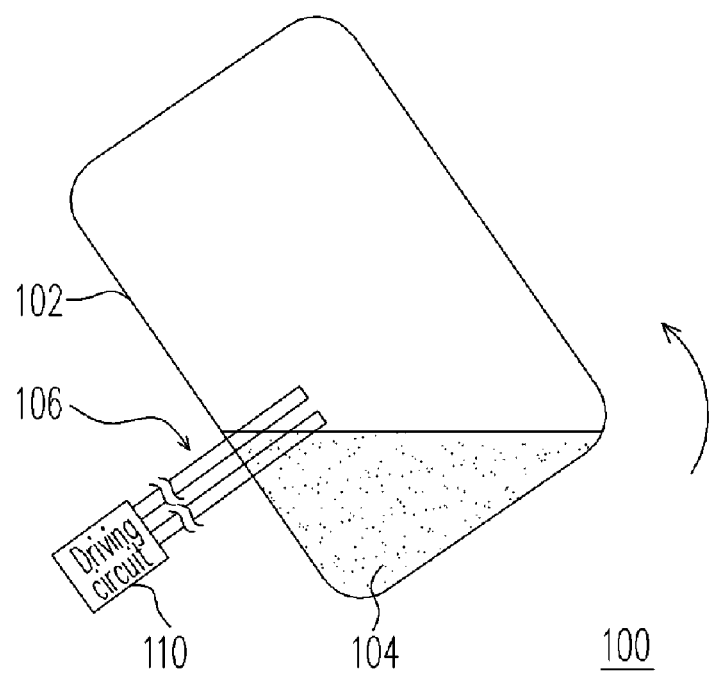
FIG. 1B is a schematic cross-sectional view of a conventional level meter in a tilted state.

Reference will now be made in detail to the present preferred embodiments of the invention, examples of which are illustrated in the accompanying drawings. Wherever possible, the same reference numbers are used in the drawings and the description to refer to the same or like parts.

In the present invention, a tilting control device is installed inside an electrical product so that power to the electrical product is cut off as soon as tilting or rocking is sensed. Therefore, damage to the electrical product resulting from continued operation in the presence of tilting or rocking motion is avoided. In the following, an embodiment is used to illustrate the present invention. However, this should by no means limit the scope of the present invention. In fact, the following embodiment can be modified by someone familiar with the technology, and yet, still falls within the scope of the present invention.

Figure 2:
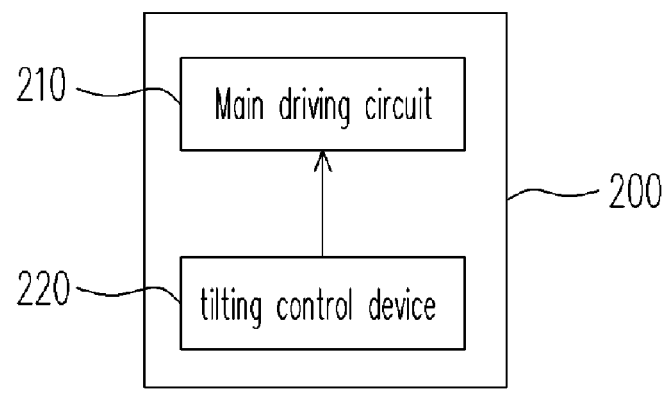
FIG. 2 is a block diagram of an electrical product according to one embodiment of the present invention.

FIG. 2 is a block diagram of an electrical product according to one embodiment of the present invention. As shown in FIG. 2, the electrical product 200 mainly comprises a main driving circuit 210 and a tilting control device 220. In one preferred embodiment of the present invention, the electrical product 200 can be an electrical appliance such as a host computer, a VCD player or a DVD player, or even an automobile or motorcycle. In general, the application of the present invention is not limited to a particular kind of electrical product.

As shown in FIG. 2, the main driving circuit 210 drives the electrical product 200. For example, if the electrical product 200 is a host computer, then the main driving circuit 210 refers to the electrical circuit on a motherboard (not shown). The tilting control device 220 is coupled to the main driving circuit 210 for detecting any tilt in the electrical product 200 and outputting the results to the main driving circuit 210 so that the main driving circuit 210 can perform an appropriate action accordingly. In the following, a detailed description of the tilting control device is provided.

Figure 3:
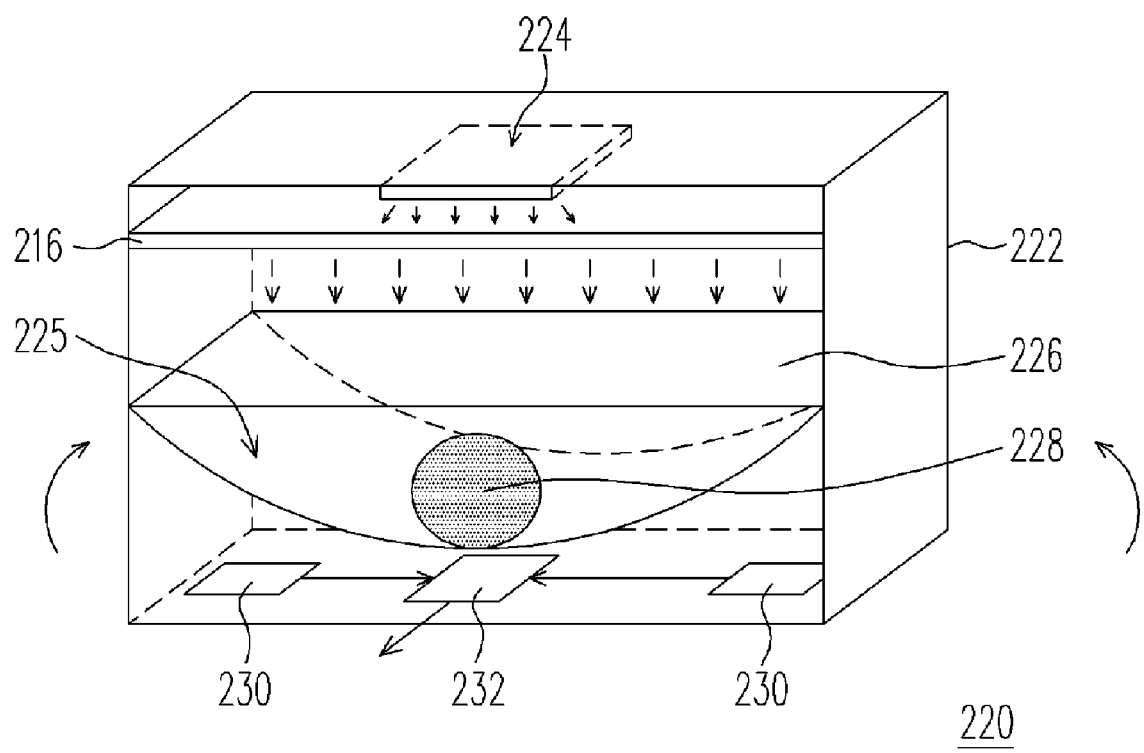
FIG. 3 is a perspective view of a tilting control device according to one embodiment of the present invention.

FIG. 3 is a perspective view of a tilting control device 220 according to one embodiment of the present invention. As shown in FIG. 3, the tilting control device 220 mainly comprises a shell body 222, a light source 224, a transparent box 226, an opaque element 228, a plurality of photo-sensing units 230 and a logic circuit 232. The light source 224 is disposed inside the shell body 222 for providing a light beam. In one preferred embodiment, the light source 224 is a light-emitting diode (LED) or other common light-emitting device, for example.

The transparent box 226 is disposed within the shell body 222 along the light traveling path. A carrier surface 225 is disposed within the transparent box 226 for supporting the opaque element 228. In one preferred embodiment, a light guide 216 is disposed between the light source 224 and the transparent box 226 for guiding light from the light source 224 into the transparent box 226 evenly and increasing the utilization of light.

In particular, the carrier surface 225 of the transparent box 226 in the present embodiment has a U-shaped surface so that the opaque element 228 is located at the lowest point of the U-shaped carrier surface 225 when the tilting control device 220 is positioned in a level state. When the tilting control device 220 tilts to form an angle in excess of a preset angle with respect to the horizontal surface, the opaque element 228 will move towards one end of the transparent box 226. Here, the preset angle is closely related to the curvature of the U-shaped carrier surface 225. Anyone familiar with the technology may set the curvature of the U-shaped carrier surface 225 according to the actual condition.

The opaque element 228 is fabricated using a transparent material including acrylonitrile-butadiene-styrenetepolymer (ABS) or polypropylene (PP), for example. Furthermore, in one preferred embodiment of the present invention, the opaque element 228 is a spherical body, a roller or other roll-able non-transparent body. Although the opaque element 228 shown in FIG. 3 is a spherical body, this should by no means limit the shape of the opaque element 228 as such.

Figure 4:
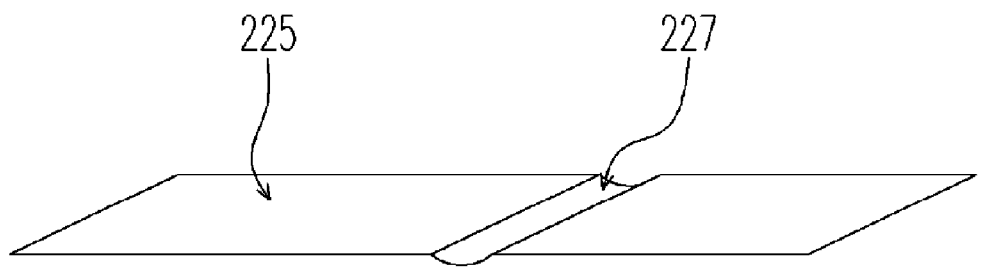
FIGS. 4 and 5 are perspective views showing the shapes of the carrier surface 225 in the transparent box 226 for two different embodiments of the present invention.
Figure 5:
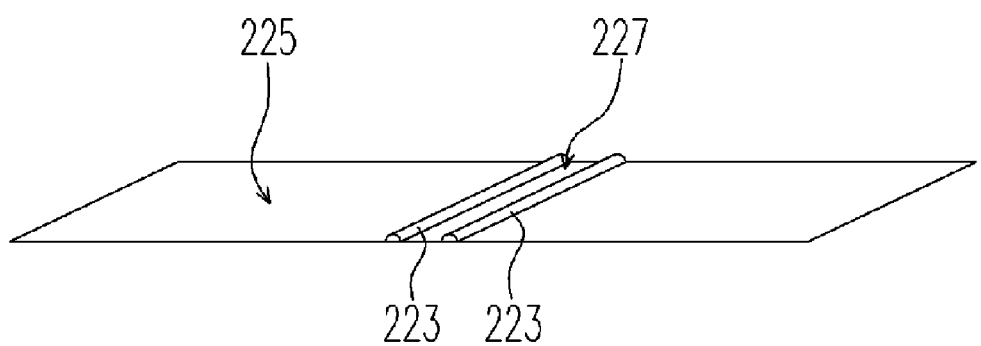

FIGS. 4 and 5 are perspective views showing the shapes of the carrier surface in the transparent box for two different embodiments of the present invention. As shown in FIGS. 4 and 5, if a roll-able non-transparent body is used as the opaque element 228, the carrier surface 225 in the transparent box 226 can be a flat surface having a restraining section 227. The opaque element 228 is constrained within the restraining section 227 when the tilting control device 220 is not tilted so that any unexpected movement of the opaque element 228 can be prevented. For example, the restraining section 227 can be a recess as shown in FIG. 4 or the mid-section between two protrusions 223 as shown in FIG. 5.

The photo-sensing units 230 are disposed at each end underneath the transparent box 226 and the logic circuit 232 is coupled to the photo-sensing units 230. When the tilting control device 220 is at a level position, the photo-sensing units 230 can receive all the light emitted from the light source 224 directly. However, as the tilting control device 220 tilts, the opaque element 228 on the carrier surface 225 will move towards one end of the transparent box 226 blocking some of the light heading towards the photo-sensing units 230 underneath the transparent box 226. According to the light intensity detected by the photo-sensing units 230, the logic circuit 232 issues a warning signal or outputs a signal to the main driving circuit 210 in FIG. 2 to perform an appropriate action, such as shutting down the driving power source (not shown) accordingly.

To familiarize with the operation of the present invention, a detailed account to the circuit used in the tilting control devices is provided below.

Figure 6:
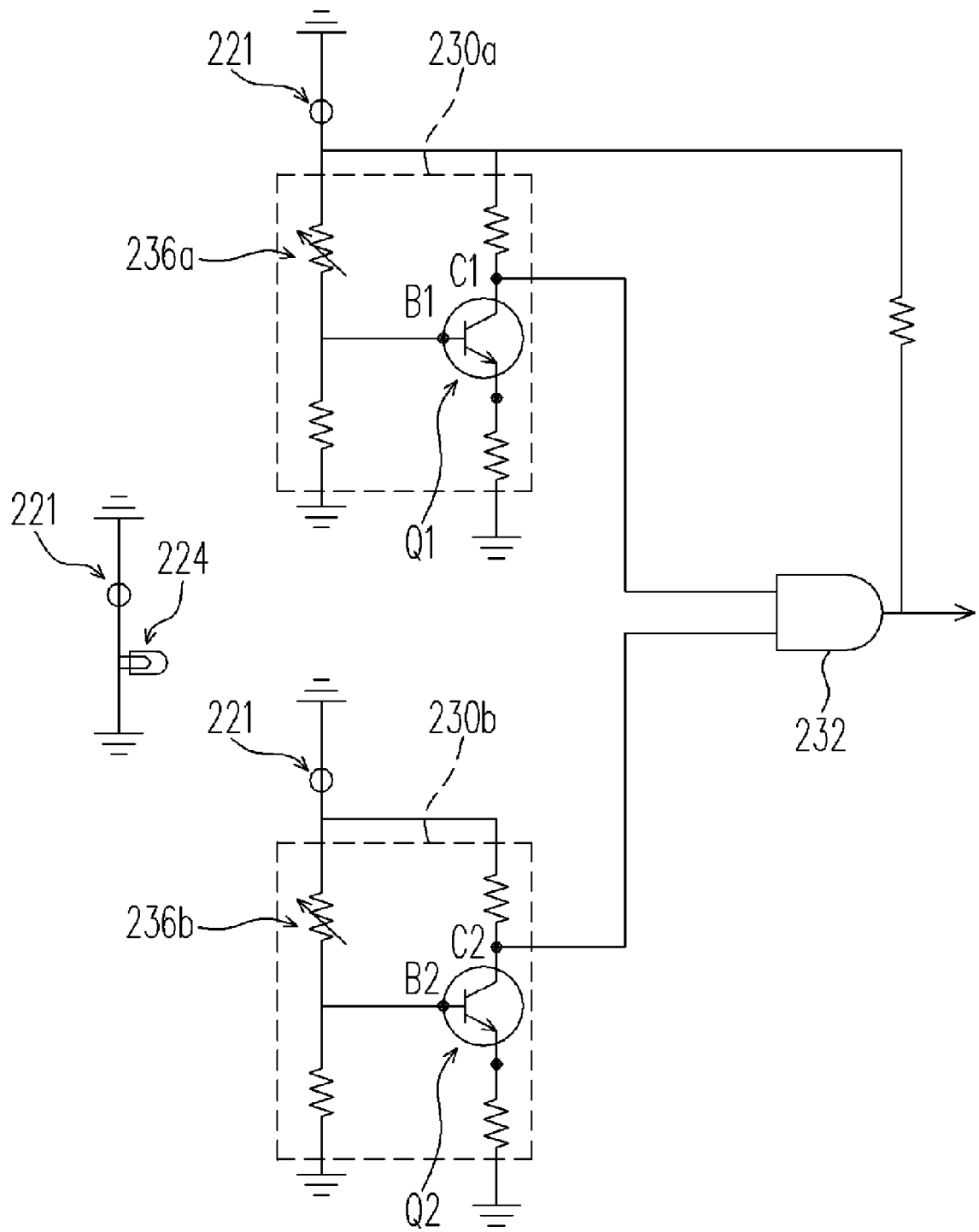
FIG. 6 is a simplified circuit diagram of the tilting control device 220 according to one embodiment of the present invention.

FIG. 6 is a simplified circuit diagram of the tilting control device according to one embodiment of the present invention. As shown in FIG. 6, the power supply 221 provides the power needed to drive the light source 224 and the photo-sensing units 230. It should be noted that power to the light source 224 and the photo-sensing units 230 of the present invention can be provided by an independent power supply 221 or shared by a single power source (not shown) that provides power to the main driving circuit in FIG. 2. There is no particular restriction about this aspect in the present invention.

In the present embodiment, a photo-sensing unit 230a and a photo-sensing unit 230b are disposed at the two ends underneath the transparent box 226. The photo-sensing unit 230a comprises a photo-sensitive resistor 236a and a switching device 238a while the photo-sensing unit 230b comprises another photosensitive resistor 236b and another switching device 238b, for example. The power supply 221 is coupled to the photosensitive resistor 236a and the photosensitive resistor 236b. The switching device 238a is coupled to the photosensitive resistor 236a and the logic circuit 232 for electrically connecting the photosensitive resistor 236a with the logic circuit 232 by selection. The switching device 238b is coupled to the photosensitive resistor 236b and the logic circuit 232 for electrically connecting the photosensitive resistor 236b and the logic circuit 232 by selection.

In one preferred embodiment of the aforementioned invention, a transistor Q1 serves as the switching device 238a and another transistor Q2 serves as the switching device 238b. The base B1 of the transistor Q1 is coupled to the photosensitive resistor 236a and the base B2 of the transistor Q2 is coupled to the photosensitive resistor 236b. The collector C1 of the transistor Q1 and the collector C2 of the transistor Q2 are respectively coupled to the logic circuit 232.

It should be noted that the logic circuit 232 in the present embodiment is an NOR type logic circuit, for example. In the following, the electrical action performed by the tilting control device 220 is explained in more detail with reference to FIG. 6.

As shown in FIGS. 3 and 6, before the tilting control device 220 is tilted, the opaque element 228 is located at the central portion of the transparent box 226. Therefore, the light intensity received by various photo-sensing units 230 is higher and the internal resistance of the photosensitive resistors 236a/236b is smaller. Thus, the current flowing through the base B1/B2 of the transistor Q1/Q2 will lead the transistor Q1/Q2 into a saturation state. At this moment, the collector C1/C2 of the transistor Q1/Q2 outputs a low voltage to the logic circuit 232 while the logic circuit 232 outputs a high voltage signal. When the main driving circuit 210 as shown in FIG. 2 receives the high voltage signal from the logic circuit 232, the electrical product 200 is regarded as operating in a level state so that no other operation is executed.

Conversely, when the tilting control device 220 tilts or rocks, the opaque element 228 will at least move towards one end of the transparent box 226 and block part of the light going to the photosensitive unit 230a and/or the photosensitive unit 230b. Thus, the intensity of light picked up by the photosensitive unit 230a and/or the photosensitive unit 230b is reduced. At this point, the internal resistance of the photosensitive resistor 236a and/or the photosensitive resistor 236b will increase. Consequently, the current flowing into the base B1 and/or the base B2 will trigger the transistor Q1 and/or the transistor Q2 into a cut-off state. The collector C1 and/or the collector C2 will output a high voltage to the logic circuit 232 while the logic circuit 232 output a low voltage signal. When the main driving circuit 210 of FIG. 2 receives the low voltage signal from the logic circuit 232, a power shutdown signal is output to prevent any damage to the electrical product 200 under such condition.

Figure 7:
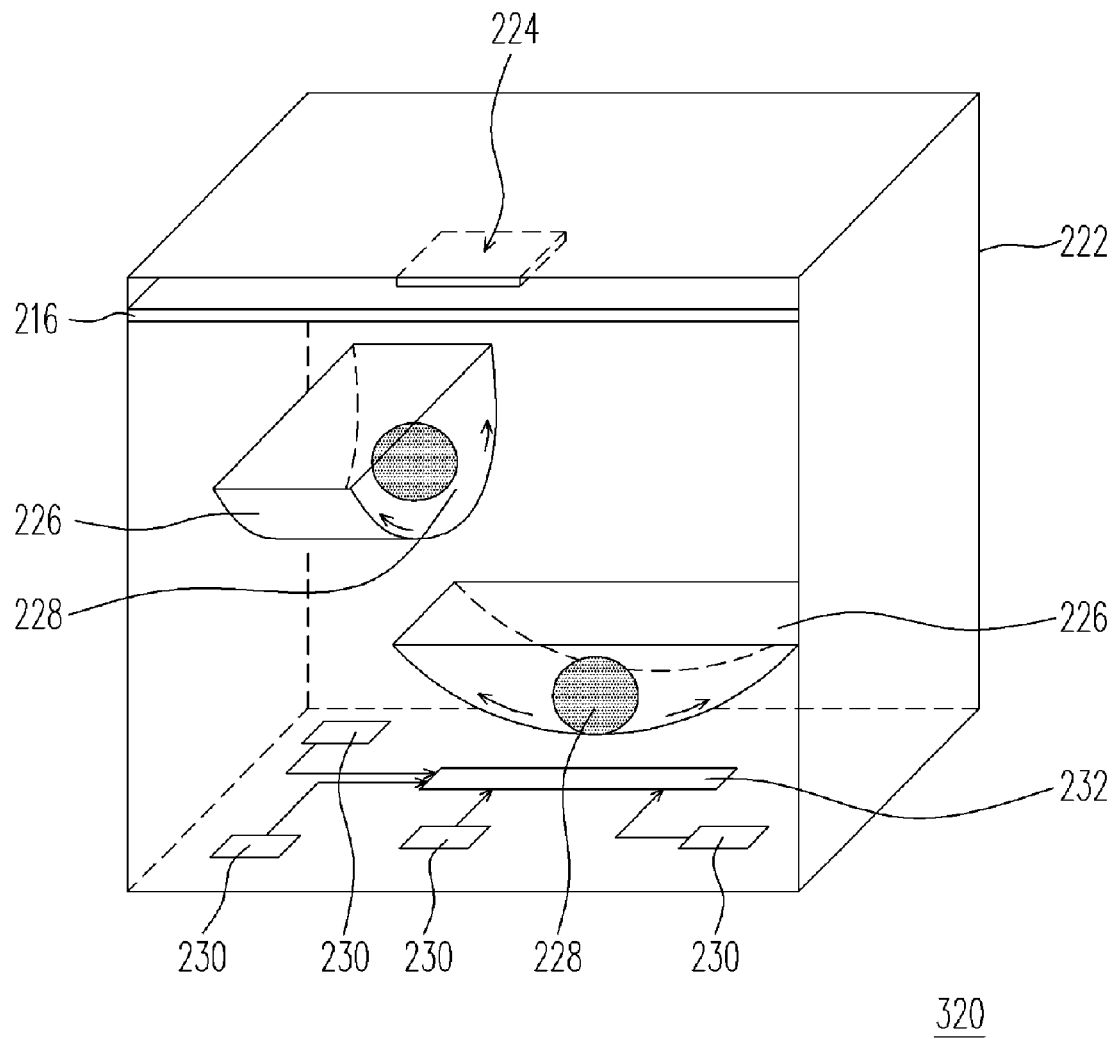
FIG. 7 is a perspective view of a tilting control device according to another embodiment of the present invention.

It should be noted that the tilting control device 220 in the aforementioned embodiment has only one transparent box 226. However, anyone familiar with the technology may notice that a tilting control device having a single transparent box can monitor the tilt of a corresponding single axis only. To monitor the tilt in more than one axis, the present invention allows the disposal of multiple transparent boxes 326 inside a tilting control device 320 as shown in FIG. 7 such that the opaque element 228 inside each transparent box 326 rolls in a different direction.

Obviously, the electrical product in the present invention also allows deployment of multiple single axis tilting control devices similar to the one in FIG. 3 for monitoring the tilt of each corresponding axis. Alternatively, a single tilting control device as shown in FIG. 7 having the capacity to monitor tilting in various axial directions can be used.

In summary, the tilting control device of the present invention utilizes the light intensity received by the photo-sensing unit to determine if a tilt has actually occurred. Once tilting or rocking motion has been detected, power to the electrical product is automatically cut off. Hence, damage to the electrical product resulting from operating in a tilted state is prevented.

Furthermore, a photoelectric sensing method instead of mercury is used to detect the degree of tilt, thus this particular design is environmentally friendly. In addition, the tilting control device is also safer to manufacture than the conventional mercury type level meter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A tilting control device, comprising:
   a shell body;
   a light source disposed inside the shell body for producing a light beam;
   at least a transparent box having a carrier surface therein disposed inside the shell body along the traveling path of the light beam;
   an opaque element disposed on the carrier surface of the transparent box, wherein the opaque element moves towards one end of the transparent box when the tilting control device tilts;
   a plurality of photo-sensing units disposed inside the shell body at each end underneath the transparent box; and a logic circuit coupled to the photo-sensing units for gauging the light intensity received by the photo-sensing units and outputting a signal.

2. The tilting control device of claim 1, wherein the device further comprises a light guide disposed between the light source and the transparent box.

3. The tilting control device of claim 1, wherein the opaque element has the shape of a sphere or a cylindrical roller.

4. The tilting control device of claim 1, wherein the carrier surface of the transparent box is U-shaped.

5. The tilting control device of claim 1, wherein the carrier surface of the transparent box has a restraining section such that the opaque element is constrained within the restraining section before the tilting control device is tilted.

6. The tilting control device of claim 5, wherein the restraining section is a recess.

7. The tilting control device of claim 5, wherein the carrier surface of the transparent box has two protrusions such that the restraining section is located between the protrusions.

8. The tilting control device of claim 1, wherein each photo-sensing unit comprises:
   a photosensitive resistor; and
   a switching device coupled to the photosensitive resistor and the logic circuit for electrically connecting the photosensitive resistor and the logic circuit by selection.

9. The tilting control device of claim 8, wherein the switching device comprises a transistor such that the base of the transistor is coupled to the photosensitive resistor and the collector of the transistor is coupled to the logic circuit.

10. The tilting control device of claim 1, wherein the logic circuit is an NOR logic circuit.

11. The tilting control device of claim 1, wherein the shell body is fabricated using a non-transparent material.

12. An electrical product, comprising:
    a main driving circuit for driving the electrical product;
    at least one tilting control device, having:
    a shell body;
    a light source disposed inside the shell body for producing a light beam;
    at least a transparent box having a carrier surface therein disposed inside the shell body along the traveling path of the light beam;
    an opaque element disposed on the carrier surface of the transparent box, wherein the opaque element moves towards one end of the transparent box when the tilting control device tilts;
    a plurality of photo-sensing units disposed inside the shell body at each end underneath the transparent box; and
    a logic circuit coupled to the photo-sensing units for gauging the light intensity received by the photo-sensing units and outputting a signal to the main driving circuit.

13. The electrical product of claim 12, wherein the tilting control device further comprises a light guide disposed between the light source and the transparent box.

14. The electrical product of claim 12, wherein the opaque element has the shape of a sphere or a cylindrical roller.

15. The electrical product of claim 12, wherein the carrier surface of the transparent box is U-shaped.

16. The electrical product of claim 12, wherein the carrier surface of the transparent box has a restraining section such that the opaque element is constrained within the restraining section before the tilting control device is tilted.

17. The electrical product of claim 16, wherein the restraining section is a recess.

18. The electrical product of claim 16, wherein the carrier surface of the transparent box has two protrusions such that the restraining section is located between the protrusions.

19. The electrical product of claim 12, wherein each photo-sensing unit comprises:
    a photosensitive resistor; and
    a switching device coupled to the photosensitive resistor and the logic circuit for electrically connecting the photosensitive resistor and the logic circuit by selection.

20. The electrical product of claim 19, wherein the switching device comprises a transistor such that the base of the transistor is coupled to the photosensitive resistor and the collector of the transistor is coupled to the logic circuit.

21. The electrical product of claim 12, wherein the logic circuit is an NOR logic circuit.

22. The electrical product of claim 12, wherein the shell body is fabricated using a non-transparent material.

* * * * *